United States Patent [19]

Thomas

[11] Patent Number: 5,197,999
[45] Date of Patent: Mar. 30, 1993

[54] POLISHING PAD FOR PLANARIZATION

[75] Inventor: Michael E. Thomas, Milpitas, Calif.

[73] Assignee: National Semiconductor Corporation, Santa Clara, Calif.

[21] Appl. No.: 767,690

[22] Filed: Sep. 30, 1991

[51] Int. Cl.⁵ .............................................. C09K 3/14
[52] U.S. Cl. ........................................ 51/298; 51/307; 51/308; 51/309
[58] Field of Search .................. 51/298, 307, 308, 309

[56] References Cited

U.S. PATENT DOCUMENTS

| | | | |
|---|---|---|---|
| 4,150,514 | 4/1979 | Douglass | 51/298 |
| 4,189,395 | 2/1980 | Bland | 51/298 |
| 4,221,572 | 9/1980 | Torimae et al. | 51/298 |
| 4,243,842 | 1/1981 | Yancey | 51/298 |
| 4,481,126 | 11/1984 | Trinh et al. | 51/298 |
| 4,609,380 | 9/1986 | Barnett et al. | 51/298 |
| 4,720,941 | 1/1988 | Belieff et al. | 51/298 |
| 4,927,432 | 5/1990 | Budinger et al. | 51/298 |
| 4,954,141 | 9/1990 | Takiyama et al. | 51/298 |

Primary Examiner—William R. Dixon, Jr.
Assistant Examiner—Willie J. Thompson
Attorney, Agent, or Firm—Irving S. Rappaport; Stephen R. Robinson; William H. Murray

[57] ABSTRACT

A pad for planarization by mechanical polishing of a dielectric layer formed over features on a wafer in the manufacture of semiconductor devices has a substantially planar polishing face. The pad includes a soft matrix material and a substance for stiffening distributed in the pad so as to effect stiffening of the pad. The substance for stiffening is composed of a hard substance, which in a preferred embodiment is in the form of discrete particles distributed substantially uniformly throughout substantially all of the pad.

19 Claims, 3 Drawing Sheets

POLISHING PAD FOR PLANARIZATION

BACKGROUND OF THE INVENTION

This invention relates to the manufacture of semiconductor devices, and in particular to pads for planarization by mechanical polishing of dielectric layers formed over components in the manufacture of semiconductor devices.

During the manufacture of semiconductor devices, it is advantageous to provide a planarized surface for the purpose of avoiding problems, such as non-uniform resist exposure, associated with lithography on the non-planar surface of the wafer. Planarization is commonly achieved by providing a planarizing layer over a topographical surface which is a dielectric substance. The dielectric substance may be, for example, a spin-on-glass. Such planarizing layers generally provide a high degree of planarization for periodic features which are approximately 10 microns or smaller. Such small, repeating features are referred to as high-frequency features. However, such planarizing layers provide relatively poor planarization for underlying features having large periodicity. Rather, the upper surface of the planarizing layer tends to reflect the topography of the underlying structures. Such large features, also referred to as low-frequency features, may be, for example, separated by characteristic distances of 1 millimeter or more. Consequently, polishing techniques, ordinarily using a rotating soft pad and a fluid or slurry between the pad and the surface, are employed to obtain long-range planarization where the underlying features are spatially large.

However, such polishing techniques are not entirely successful. When the underlying structures are repeating, the surface of the dielectric has a regular periodic waveform. Regions of high-frequency features are separated by regions of few or no features in some devices. This type of topography leads to a wave-like dielectric surface after planarization. Soft pads begin to become ineffective in planarizing features having periodicities on the order of about 100 microns and greater. Various structures, such as interconnects, when randomly routed on devices such as gate arrays, can have periodicities in excess of 1 millimeter. In VLSI devices, large separations between features are encountered, especially in the peripheral areas of the device. The height of an oxide on a wafer for memory chips may have a high point in the arrays of each chip and a low point at or in the vicinity of the scribe line between dies. The period of such variation in height may thus be as much as 5 millimeters, especially between die on a wafer. Conventional soft pads, as noted above, are not effective in planarization over such distances. Thus, conventional soft pads are not effective in planarization of dielectric layers formed over interconnects with large periodicities greater than approximately 100 microns.

Wafer surfaces are not generally perfectly planar. Rather, wafers have thickness variations and warp or bow. As a result, a rigid planar polishing pad would also fail to provide a uniform planarizing layer for use. For example, a rigid planar polishing pad may provide a substantially planar surface in one region of a wafer, while, in other regions of the wafer, because of non-uniformities in the wafer, it removes an excessive amount of the thick planarizing layer and even damages the underlying structures.

Use of a rigid planar polishing pad also requires that the pad surface and the wafer surface be maintained effectively parallel to one another essentially over the whole wafer area. If the surfaces are not parallel, different amounts of the thick planarizing layer may be removed from different regions of the wafer. Consequently, there may be a failure to remove enough material to planarize some sections of the wafer. In other sections of the wafer, the thick planarizing layer may be made too thin, and underlying structures may also be damaged by the rigid pad.

Objects and advantages of the invention will become apparent from the detailed description of a preferred embodiment which follows.

SUMMARY OF THE INVENTION

A pad for planarization by mechanical polishing of a dielectric layer formed over features on a wafer in the manufacture of semiconductor devices comprises a substantially planar polishing face, a soft matrix material and a stiffening means comprising a hard substance distributed in the pad.

DETAILED DESCRIPTION OF A PREFERRED EMBODIMENT

Figure 1:
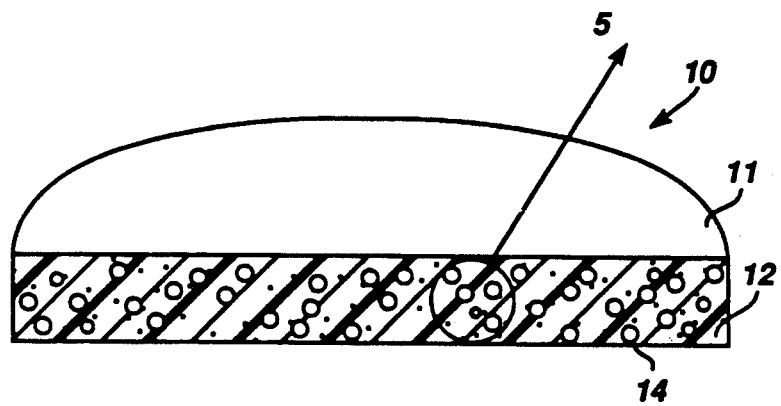
FIG. 1 is a cutaway perspective view of a pad according to the invention.
Figure 5:
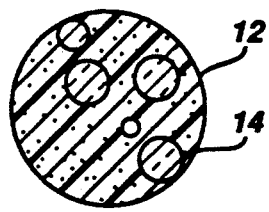
FIG. 5 is an enloargement of the portion of FIG. 1 designated "5".

With reference to FIGS. 1 and 5, there is shown a pad 10 according to the invention. Pad 10 is cylindrical, and has a substantially planar polishing face 11. Pad 10 comprises a soft, flexible matrix substance 12 with a stiffening means 14 distributed in the pad. The stiffening means 14 is distributed in the pad so as to provide stiffening of the pad. Stiffening means 14 is distributed substantially uniformly throughout substantially all of the pad.

The term "distributed," as used in this application, encompasses both particles dispersed by mixing as disclosed below, and periodic or regular continuous structures or discrete bodies. The term "distributed" also encompasses long chains where some links are of a soft material, comprising the soft matrix, and other links are of a hard material, comprising the stiffening means. For example, a copolymer may be provided where some of the links are a urethane comprising a soft matrix and between some of those links are provided aramid, comprising the hard phase, directly incorporated into the urethane chain.

Stiffening means 14 is a hard substance. Specifically, stiffening means 14 comprises a large number of discrete particles. The soft matrix substance 12 is, for example, a foamed or blown polymer. Examples of polymers which may be used according to the invention are solid or foamed polyurethanes, polyesters and polyamides.

The discrete particles 14 are preferably solid. Particles 14 may be made of numerous materials. Examples of materials that may be used include glass, graphite, diamond, aramid, silicon carbide, alumina and silicon nitride. If the discrete particles are of glass, the particles may be either in the form of fibers or substantially spherical. Hard particles made of other materials, such as graphite and aramid, may also be in the form of fibers. In the embodiment shown in FIG. 1, the discrete particles 14 are small with respect to the pad body.

Although it will not be described here, it can be envisioned that the hard stiffening means could be in the form of a lattice extending throughout the pad, or in the form of long, curved fibers. The only limitation placed on the physical size of the stiffening means is that it be contained at least partially within the pad and not protrude substantially beyond the polishing face. The stiffening means must not inhibit the soft material from acting together with the slurry to provide polishing. It is believed to be important to an effective pad that the amount of foamed soft matrix material exposed at the polishing face be sufficient, combined with the action of the slurry to accomplish polishing. The physical interaction of the polishing face and the slurry, is believed to be essential to effective polishing.

In the disclosed embodiment, the stiffening means is distributed substantially uniformly throughout substantially all of the pad body. It can be envisioned, although it will not be described here, that the stiffening means is not distributed uniformly. For example, in a pad according to the invention, the density of the stiffening means could be relatively high near the polishing face and decrease as distance from the polishing face increases. A pad according to the invention could be envisioned, although it will not be described here, where the hard stiffening means is not distributed throughout the entire volume of the pad. The hard stiffening means in a pad according to the invention must be distributed within the pad so as to effect stiffening of the pad at the polishing face.

A binder or adhesion promoter can be used within the pad 10 to enhance adhesion between the discrete particles 14 and the soft substance 12. An example of a binder for glass is hexamethyldisilizane (HMDS).

The soft matrix substance is formed by standard techniques in the manufacture of polymeric pads. According to these techniques, a liquid is provided in a cylindrical container. The discrete particles are added to the liquid and mixed prior to or during the time that polymerization is initiated with the addition of an activator. When polymerization is complete, the liquid has polymerized into a soft matrix material in the form of a cylinder. It is highly desirable that this soft matrix material be a foamed polymer. The mixing provides a substantially uniform distribution of the hard particles throughout the soft matrix material.

Pads are formed by cutting slices, perpendicular to the axis of the cylinder, from the cylinder of polymerized soft matrix material. Each pad is thus substantially cylindrical, and each pad has a substantially planar polishing face.

Softness and hardness are measured by the modulus of elasticity of a material. In this application, the term "soft" denotes materials having a modulus of elasticity below 5 million psi. Conventional polymeric pad materials typically have a modulus of elasticity in the range of approximately 0.1–0.7 million psi. For example, solid polyurethane has a modulus in the range of 0.30 to 0.60 million psi. For foamed polymeric materials, the modulus can be substantially lower due to the incorporation of open pores in the polymer. consequently, a foamed polymeric pad will have a modulus typically on the order of 10, and conceivably up to 100, times smaller than the value of the solid material. In a pad according to the invention where the soft matrix material is a foamed polymer, the modulus of elasticity of the soft matrix material will typically be between approximately 1,000 and approximately 70,000 psi. The soft matrix of a pad according to the invention is preferably composed of the same material as a conventional polymeric pad.

In this application, the term "hard" denotes materials having a modulus of elasticity in excess of 5 million psi. For example, silicon dioxide, which may be used as the hard phase, has a modulus of about 50 million psi. As another example, amorphous silica, which has a modulus of about 10 million psi, may be used as the hard phase.

The relationship between the modulus E of the pad, the modulus $E_m$ of the soft substance and the modulus $E_p$ of the hard particles may be expressed as $E = E_p \times V_p + E_m \times (1 - V_p)$, where $V_p$ is the fraction of the volume of the composite pad occupied by the hard particles. This relation shows that a greater density of particles will create a more rigid pad. This relation can be used to fine tune the modulus of a pad. By changing the proportion of the volume occupied by the hard particles, or $V_p$, the modulus E can be changed. By mixing different hard particles in the pad, a pad with two or more types of particles may be made. If such particles have a different modulus $E_p$, the modulus E of the pad will be changed. Alternatively, the entire hard phase may be replaced by a different material having a different modulus $E_p$. Replacement of the entire hard phase with a material having a different modulus will also result in a change in the modulus E of the pad.

It should be noted that the above formula for the value of the pad modulus E is not precise. However, the formula qualitatively describes the relationship among the modulus of the soft matrix, the modulus of the hard material, and the resultant modulus of the pad. For any specific system, the modulus should be determined experimentally. In practice, it is difficult to measure the dynamic modulus during polishing because the polymeric matrix compresses under stress. This phenomenon, which is well-known, is known as anelasticity. Thus in practice, a designer of pads according to the invention would seek a simpler method to measure the effect of modulus changes of a pad on its polishing characteristics. The relation among the modulus of the polymeric matrix, the modulus of the hard substance and the modulus of the pad would be used in a qualitative sense for the pad designer to decide whether to construct a pad having a different proportion of hard particles, or hard particles made from a different material. The test for whether a given pad would be adequate for planarizing a particular surface would not be made by measuring the pad modulus. Rather, the test would be made by actually polishing a test surface with the pad.

The proportion of the volume of the pad occupied by the hard phase $V_p$, has a lower limit at the point where the presence of the hard phase in the matrix does not have an effect on the pad modulus or is not distributed in the pad in sufficient volume to serve as a stiffening means. It is believed that this lower volume limit is approximately 5%. The maximum value of the proportion of pad volume occupied by the hard phase is the maximum volume where the soft matrix material still behaves as a pad. It is believed that this upper limit occurs at approximately 95% of pad volume occupied by the hard phase. In order to provide a pad having a hard particle volume of 95% of the pad volume, the hard material would be added to the liquid precursor of the soft matrix, as is conventional. The materials would be mixed prior to or during the beginning of the polymerization of the soft matrix. At the end of the polymerization process, the material would be pressed to assure that the pad would be held together in a single piece by the soft matrix material.

The rigidity of the pad is selected depending on the results desired. For example, it may be desired to achieve substantially uniform flatness with allowance only for wafer imperfections. A relatively rigid pad is then provided. Such a pad tends to conform only to large-scale variations or bow on the order of centimeters in the wafer. Within the range where the pad conforms, the pad can still planarize over large distances up to thousands of microns. A rigid pad would thus have a relatively high proportion of volume occupied by the hard particles. A more rigid pad is also obtained by using, for the hard particles, harder materials, such as silicon dioxide, in place of softer materials.

Figure 2:
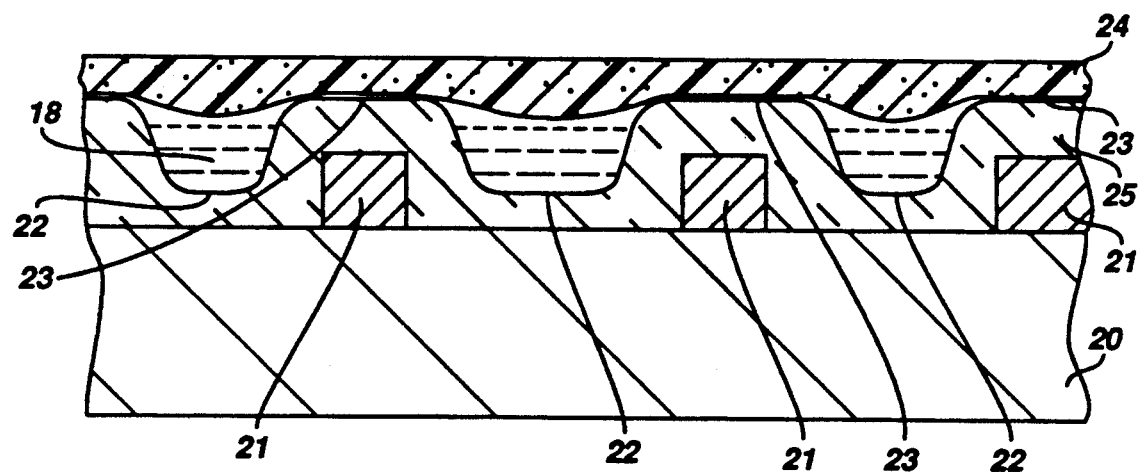
FIG. 2 is a sectional view of a prior art pad on a wafer surface.

The effectiveness of a pad may also be characterized by defining a planarization parameter p. As noted above, a dielectric layer formed over repeating features on a wafer will have a wave-like structure. Generally, these waves will substantially be square waves. These waves have an amplitude, referred to as A. The following equation uses a planarization parameter p, having units of reciprocal centimeters, to relate a depth of oxide, or dielectric, removed to the amplitude of features on the surface:

$$\ln (A(t)/A_o) = -px$$

Where $A_o$ is the amplitude before polishing begins. $A(t)$ is the amplitude as a function of polishing time t. The letter x represents the average depth of dielectric removed by the pad in time t. For example, a soft conventional polymeric pad, when polishing a surface which has a relatively short characteristic distance between features, such as 100 microns, will not tend to conform to the waves on the surface of the dielectric. This is illustrated in FIG. 2. Referring to FIG. 2, wafer 20 has features 21 on its surface. A dielectric layer 25 covers features 21 and the surface of the wafer. Dielectric layer 25 forms a square wave having peaks 23 and troughs 22. Soft conventional polymeric pad 24 is applied to the surface of wafer 22. At present, it is believed that pad 24 only drops slightly between adjacent peaks of the dielectric, as illustrated. Slurry 18 occupies the space between the polishing face of pad 24 and the dielectric 25. Thus, pad 24 will act on the peaks 22 on the surface of wafer 20, but will remove little dielectric from the troughs 23. Consequently, the amplitude will decrease quickly, and the value of p will be relatively high.

Figure 3:
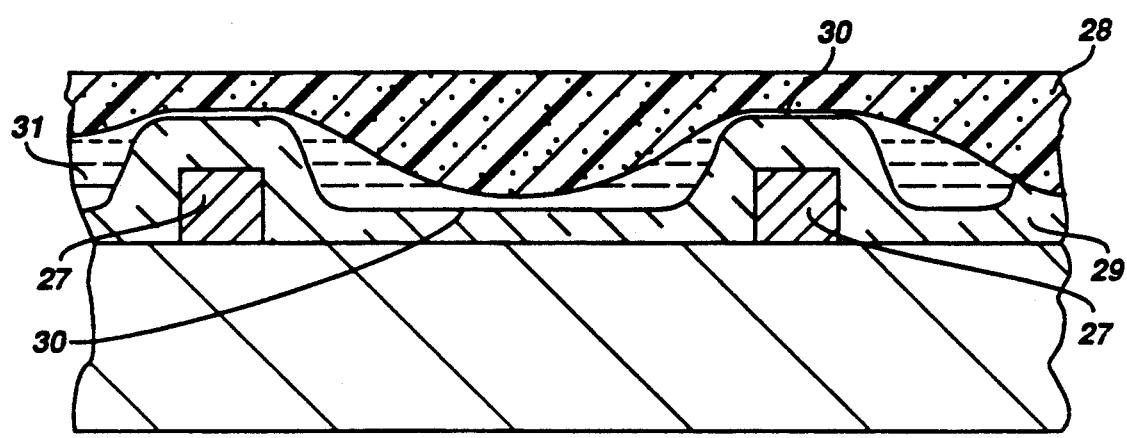
FIG. 3 is a sectional view of a prior art pad on another wafer surface.

The value of p varies with pad composition and the topography of the surface. The polishing face of a soft conventional polymeric pad, on a surface with a long distance between features, such as 1 millimeter and greater, will conform to the surface. This is illustrated in FIG. 3. Wafer 26 has repeating features with a relatively long distance, such as 1 millimeter, between features. A dielectric layer 29 is formed on the wafer surface over features 27, which forms a square wave having peaks 30 and troughs 32. Slurry 31 occupies the space between the polishing surface of pad 28 and dielectric layer 29. Soft conventional polymeric pad 28 is placed on the dielectriccoated wafer 26 for planarization. At present, it is believed that the polishing face of pad 28 tends to conform to the topography of the wafer 26, as illustrated. Consequently, pad 28 will remove dielectric from both the troughs 32 and peaks 30 of the dielectric surface. The amplitude of the waves in the dielectric will decrease relatively slowly, and the value of planarization parameter p will be low. By increasing the rigidity of the pad the value of planarization parameter p will be increased.

Figure 4:
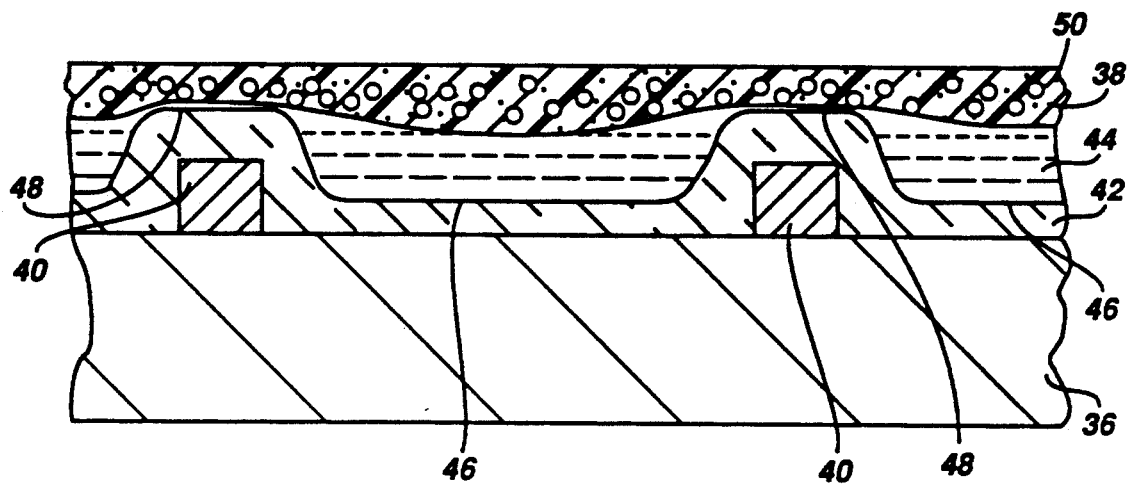
FIG. 4 is a sectional view of a pad according to the invention on a wafer surface.

A pad according to the invention is illustrated in cross section on a wafer surface in FIG. 4. Wafer 36 has features 40 on its surface. The characteristic distance between features 40 is large, i.e., in excess of 100 microns. Dielectric layer 42 covers the surface of wafer 36 and features 40. Dielectric layer 42 conforms to the underlying topography, whereby peaks 48 and troughs 46 are formed on the surface of dielectric layer 42. Pad 38 according to the invention is provided for polishing on the surface. Hard particles 50 are provided as stiffening means in pad 38. Slurry 44 occupies the space between the polishing surface of pad 38 and the surface of dielectric layer 42. The pad 38 is relatively rigid, and so tends to polish peaks 48 with minimal polishing of troughs 46.

Use of the above equation in designing pads according to the invention occurs as follows. It is desired to fabricate a pad for planarization of a surface having a known characteristic distance between features. A test surface having a repeating topography with the same characteristic distance between features is prepared. An initial test pad is then fabricated. The composition of this pad is preferably an estimate of a pad having the desired properties based on prior experience. The composition of the initial test pad may be a soft matrix of foamed polyurethane with a hard phase of spheres of silicon dioxide, having a radius of 3 microns, which hard phase occupies 20 percent of the total pad volume.

The pad is tested, by polishing for a defined period of time, on the test surface having repeating topography, or patterned test surface. Polishing is preferably performed in accordance with standard techniques, using a slurry between the pad and the wafer. In a preferred test polishing procedure, the slurry consists of a colloidal silica which is dispersed in a basic aqueous medium, with a pH of about 11. The rotational velocity of the platen which holds the polishing pad is 10 revolutions per minute; the rotational velocity of the carrier which holds the wafer is 12 revolutions per minute, and the pressure with which the wafer is held against the pad is 6 pounds per square inch. Polishing time is 10 minutes.

The amplitude change of the patterned test surface is measured after polishing. The height of the features on the patterned test wafer is measured by standard techniques, such as measurements by a stylus profilometer. An example of a stylus profilometer is a Dektak 3030, made by Sloan Instruments, of Santa Barbara, Calif. The value of the planarization parameter p is then calculated. The average depth of oxide removed from the test surface is the variable x. The average is calculated from the average of the depth of oxide removed from a peak and the depth of oxide removed from a trough. The initial amplitude of the waves on the test surface is $A_o$. The amplitude on the test surface after polishing is $A(t)$. If the value of p is sufficiently high, then the composition of that test pad will be designated for use with surfaces having a characteristic distance between features the same as that of the test surface. A desirable value of p would be at least 2.0 per micrometer. A very good value of p would be at least 3.0 per micrometer.

If the planarization parameter p has a value that is too low, then a second test pad is fabricated. This second test pad is designed to have a higher modulus and thus a higher value for the planarization parameter p. There are two means by which the value of the modulus of the pad, and hence the planarization parameter p, may be increased. First, the percentage of the volume of the pad occupied by the hard particles may be increased. Second, a harder material may be substituted for a softer material in the hard phase. For example, if borosilicate glass, or silica, which each have a modulus of elasticity of about 10,000,000 psi, is used for the hard phase in the initial test pad, then silicon dioxide or another hard substance may be substituted, in whole or in part, in the second test pad in order to increase the modulus of elasticity of the pad. Each value of p relates to a particular characteristic distance between features. It is believed that a pad according to the invention can have a value of p of 2.0 per micrometer for a characteristic distance between features of at least 5 millimeters. It is believed that a high value of p could be achieved by a pad having about 95% by volume of hard phase. It is believed that such a pad could achieve a value of p of 3.0 per micrometer on a surface having a characteristic separation between features of as much as 5 centimeters.

It should be noted that the above relation, in which there is a logarithmic relationship between amplitude and polishing time, does not apply for all pads. This relation only applies to flexible pads that, it is believed, simultaneously remove dielectric from both troughs and peaks of a dielectric surface on a wafer. A very rigid pad, by contrast, will remove dielectric only from peaks. For such a rigid pad, the relation between polishing time and amplitude is linear.

A useful model for predicting the degree of planarization that can be achieved by a given pad on a surface having a given characteristic length between features is the beam model. In the beam model, the minimum amplitude of features that can be achieved is predicted. The beam model analyzes the relationship among deflection of a pad, load on the pad, and modulus of elasticity of the pad, by treating the pad as a beam spanning a distance equal to the average distance between features. The following equation relates maximum deflection to average modulus E:

$$\delta = 4/3 P \times L^3 / (E \times I)$$

P is the downward pressure applied on the pad. L is the characteristic distance between features. I is the moment, which is calculated, for the purposes of this model, as if the pad were a beam supported between two topographical features on the wafer. The symbol $\delta$ refers to the deflection of the center of the pad from a horizontal line joining the points where the pad is supported on the features. This model predicts the minimum amplitude of the features that can be achieved by a given pad, at a given pressure, for a given typical distance between features. The minimum amplitude of features after polishing will be one-half the maximum deflection.

The relationship between deflection and the average modulus is useful in designing pads according to the invention. The minimum amplitude of remaining features for a given pad composition can be calculated. If this amplitude is not within acceptable limits, the composition of the pad can be changed. It will be noted that the deflection increases as the cube of the characteristic distance between features. Consequently, even a small change in the characteristic distance will require significant changes in pad modulus to maintain the same maximum deflection. Thus, considerable changes in pad composition may be required with even a small change in the characteristic distance between features.

An example of the calculation of the deflection follows. This example uses typical values for the various parameters. A typical value of the characteristic distance between features, L, is 1,000 microns. The moment, I, in this model, is equal to $bh^3/12$. In this equation, h represents the pad height. The pad height is typically 1,000 microns. The parameter b represents seam width or width of the pad supported on the features. It is assumed that the beam is square; thus the parameter b is 1,000 microns. The downward pressure is typically 6 pounds per square inch. In a conventional polymeric pad, the modulus of the solid polymer is about 500,000 psi and so the modulus of the foamed matrix material is about 50,000 psi. After entering these values in the equation for the deflection of the center of the pad from the horizontal line, it is found that the deflection of the pad with a modulus of 50,000 psi is approxi-mately 19,200 Angstroms. If the pad has 20% by volume silicon dioxide, then the overall modulus would be about 10,000,000 psi. Such a pad would have a deflection on the order of about 100 Angstroms. Such a deflection would tend to indicate that the pad is sufficiently rigid for adequate planarization.

It will be noted that the thickness of the pad enters into the above equation for the deflection. Rigidity may be increased on a macroscopic scale by increasing the thickness. However, it is believed that increasing the pad thickness, although it should have a positive affect on the planarization, does not completely address the tendency of the polishing face of the pad to conform to a topographic surface on a microscopic scale.

The use of the pad of the invention decreases the need to hold the pad precisely parallel to the wafer surface. The pad of the invention will tend to conform to large-scale variations on the surface of the wafer. The pad will tend to conform to wafer variations or bow even if the surface of the pad and the surface of the wafer are not held parallel with the degree of precision required when a rigid pad is used.

Typical pad composition data follow. Good results were achieved in planarizing features up to 1 millimeter across with a pad having a matrix of foamed polyurethane and a hard phase of discrete solid glass spheres, where the hard particles occupied 20% of the pad volume. Hard particles were substantially spherical, having a radius of about 3.5 microns. The value of the planarization parameter for a surface having a distance between features of 1 millimeter is approximately 2.5–3.0 per micron.

It will be appreciated that there are considerable variations that can be accomplished in an article according to the invention without departing from its scope. As a result, although a preferred embodiment of an article of the invention has been described above, it is emphasized that the invention is not limited to a preferred embodiment and that there exist other alternative embodiments that are fully encompassed within the invention's scope, which is intended to be limited only by the scope of the appended claims.

What is claimed is:

1. A pad for planarization by mechanical polishing of a dielectric layer formed over features on a wafer in the manufacture of semiconductor devices, said pad having a substantially planar polishing face, said pad comprising a soft matrix material having a modulus of elasticity below 5 million psi, and stiffening means for stiffening said soft matrix material, said stiffening means comprising a hard substance distributed in said pad, no material of said pad protruding substantially beyond said polishing face.

2. A pad as recited in claim 1, wherein said stiffening means is distributed substantially uniformly throughout substantially all of said pad.

3. A pad as recited in claim 1, wherein said hard substance comprises a plurality of discrete particles.

4. A pad as recited in claim 3, wherein said pad is substantially cylindrical and each one of said discrete particles has an average diameter equal to or less than the height of said cylindrical pad.

5. A pad as recited in claim 3, wherein said particles are solid.

6. A pad as recited in claim 3, wherein said particles comprise a substance selected from the group consisting of glass, graphite, diamond, aramid, silicon carbide, alumina, silicon nitride, silica and borosilicate glass.

7. A pad as recited in claim 3, wherein at least some of said particles comprise fibers.

8. A pad as recited in claim 7, wherein at least some of said fibers comprise glass.

9. A pad as recited in claim 7, wherein at least some of said fibers comprise graphite.

10. A pad as recited in claim 7, wherein at least some of said fibers comprise aramid.

11. A pad as recited in claim 3, wherein at least some of said particles are substantially spherical.

12. A pad as recited in claim 11, wherein at least some of said substantially spherical particles comprise glass.

13. A pad as recited in claim 1, wherein said soft matrix material comprises a polymer.

14. A pad as recited in claim 13, wherein said polymer is selected from the group consisting of polyamides, polyurethanes and polyesters.

15. A pad as recited in claim 13, wherein said polymer is foamed.

16. A pad as recited in claim 1, wherein said pad is substantially cylindrical, said planar surface comprising a base of the cylinder.

17. A pad as recited in claim 1, wherein said soft substance has a modulus of elasticity of between approximately 1,000 and approximately 70,000 pounds per square inch.

18. A pad as recited in claim 1, wherein said pad has a planarization parameter of at least 2.0 per micrometer for a surface having a characteristic feature size of up to 5 centimeters.

19. A pad as recited in claim 18, wherein said pad has a planarization parameter of at least 3.0 per micrometer for a surface having a characteristic feature size up to 5 centimeters.

* * * * *